Patented Feb. 6, 1951

2,540,233

UNITED STATES PATENT OFFICE 2,540,233

METHOD OF PRODUCING POROUS METALLIC BODIES

Wallace W. Beaver, Columbus, Ohio, assignor, by mesne assignments, to Battelle Development Corporation, Columbus, Ohio, a corporation of Delaware No Drawing. Application July 10, 1948, Serial No. 38,182

5 Claims. (Cl. 75—22)

The present invention relates generally to a method of producing high strength, permeable, porous, metallic bodies and more particularly to a method for controlling the permeability while increasing the strength of bodies made from powdered metals.

There is a great need for permeable, porous, metallic bodies as filter units, fuel mixers, flame arrestors, etc. By permeable, porous, metallic bodies is meant those structures which are of a porous nature and permit the flow of fluids therethrough. These bodies must be strong and ductile in order to withstand high pressures and temperatures, as well as rapid changes in temperatures and pressures. To properly mix or control fluids, these bodies also need even or uniform permeability. For some applications the bodies should have very low flow or very low permeability; such a body is very dense and almost solid.

Many attempts have been made in the past to strengthen permeable, porous, metallic bodies. No effort has been made to control permeability while increasing strength, and usually, the very nature of the strengthening process precludes it. These processes have results not only in a reduction in overall porosity but also a considerable reduction in permeability or in "unsealed porosity," that is, the porosity available to the flow of fluids through the body. On the other hand, the "sealed porosity," the porosity which does not contribute to the flow of fluids through the body, has increased. Moreover, the surface permeability of such bodies is generally uneven, requiring further extensive treatment to renew it.

For example, it has been proposed to sinter porous bodies at high temperatures for prolonged periods of time. Fine powders have a high consolidation or shrinkage rate, and bodies produced from fine powders and sintered by this method are apt to exhibit cracks and distortion. On the other hand, bodies made from coarse powders after such a treatment do not have the requisite strength and must subsequently be coined or impregnated. If coined, such bodies have a great increase in the "sealed porosity" over that to be normally expected from mechanical densification, and the surfaces of the metal particles of the body are likely to be smeared, reducing the evenness and volume of flow. If impregnated with a free metal or a salt that can be reduced in situ to free metal, it has been found that the metallic depositions are spotty and tend to occur at the interstices between particles, decreasing the permeability of the body without any worth-while increase in strength.

It is an object of this invention to provide a method for producing a strong, ductile, porous, metallic body of very low, even permeability.

It is another object of this invention to provide a method of obtaining a strong, ductile, porous, metallic body of low, uniform permeability from relatively coarse powders.

It is a further object of this invention to provide a method for obtaining a strong, ductile, porous, metallic body having even, low permeability whereby the degree of permeability of the sintered body may be controlled while the metallic particles, of which the body is made, are consolidated.

It is a still further object of this invention to produce a strong, ductile, porous, metallic body having uniform permeability and lower permeability than theoretically obtainable with the finest size powders available.

The present invention lies in the discovery that definite advantages are to be gained by impregnating a porous, metallic body with a material in the liquid state and then compressing this impregnated body. The liquid material provides the necessary hydrostatic pressure to keep the pores of the body open when the body is compressed and thus permits maintenance of "unsealed porosity." The liquid also acts as a lubricant between the metal particles of which the body is made and also between these particles and the die and ram, eliminating smearing of the surface of the metallic particles. After compression to the desired degree, the body may then be sintered in a reducing atmosphere to eliminate the liquid and fuse any particles ruptured or brought into contact when the body was compressed, resulting in a dense, strong body having low and even permeability and a large percentage of "unsealed" pores.

Bodies treated according to the method disclosed by this invention may have been made by many processes, i. e., briquetting, pressureless sintering, displacement casting, etc. These bodies may also have been made from fine or coarse metallic powders. Coarse powders are eminently suitable for the practice of this invention as they are economically obtained and easily handled.

If the body has to be machined prior to compressing, the metal particles contained in a refractory mold should be sintered under an oxidizing atmosphere. It is also feasible to heat a porous, metallic body in such an atmosphere. The oxidizing atmosphere may be simply commercial nitrogen which contains sufficient $O_2$ to oxidize the metal, although mixtures of $CO_2$ and $O_2$, and CO and $O_2$, have been found satisfactory. The body resulting from this treatment is hard and brittle and susceptible to machining, that is, the metallic particles do not smear on machining.

Where the body is made of copper and other ductile metals and it is not desired to machine it, the body may be directly impregnated and compressed. If the body is made of hard metals or in an oxidized state (hard, brittle), it must be rendered sufficiently ductile to be easily compressed. Prior to impregnating with oil and compressing, the body should be heated in an atmosphere of pure $H_2$ gas where hard metals like Ni, W, etc., are being used. A mixture of commercial $H_2$ gas and a fluxing gas, i. e., $SO_3$, may be substituted for the pure $H_2$. Chromium containing bodies should be heated in a reducing atmosphere containing HCl gas. This treatment removes any residual films on the surface of the metallic particles, resulting in better fusion between the metallic particles of which the body is made and a great increase in the body's ductility.

The ductile, porous body may now be impregnated with the hydrostatic material by simply immersing the body in the liquid, or by applying force, i. e., pressure or vacuum.

The hydrostatic material should be a low viscosity liquid at room temperatures and should be noncorrosive, nonexplosive, nondecomposable and substantially inert. Furthermore, the impregnant should be one which is easily removed after compression by volatilization, or burning, without leaving any residues or other undesirable compounds. It has been found that a low viscosity oil is very satisfactory for this purpose.

Of course, the hydrostatic material may be in a solid state at room temperatures. If this is true, then the material will have to be heated before the body is impregnated in order that it may readily penetrate the pores of the body. In this case provision will also have to be made for heating the body during compression so that the impregnant will readily flow and exert sufficient hydrostatic pressure to maintain the pores of the body open.

After impregnation with the hydrostatic material, the body may then be compressed in any well-known compression or coining machine. Sufficient clearance should be maintained between the die and ram of the machine, if such is used, to permit the excess impregnant to escape when the body is compressed.

When the desired degree of compression has been reached, the body may be removed from the compression machine and slowly heated in an atmosphere of hydrogen or other reducing gas. Unless the body is very strong, a slow initial heat is used to evaporate the impregnant and prevent rapid gas surges which might occur and disrupt the body if high temperatures were used at first. Instead of heating the impregnated body to remove the hydrostatic material by volatilization or burning, the hydrostatic material may be substantially removed by solvents, washing, or by use of vacuum or pressure. After this slow initial heat treatment, the temperature of the furnace is increased. This final heat treatment removes the remaining impregnant and any residues, and permits refusion of any ruptured parts of the body as well as fusion of particles brought into contact by compression.

The following examples will serve to illustrate the invention with more particularity:

*Example 1*

Alcohol and nickel powders of −100 +200 mesh were mixed together and poured into a ceramic mold to make a porous tube. After the mixture had been allowed to stand for awhile and the metallic powder had settled in the mold by sedimentation, the excess dispersing medium was decanted. The mold containing the powdered mass was then warmed to evaporate any dispersing medium absorbed by the powder which might disrupt the mass due to gas formation when placed in a high temperature furnace. The dry powder and the mold were next placed in a furnace and sintered for 4 hours at 2450° F. in an atmosphere of commercial nitrogen gas. The resulting tube, 2″ O. D. x ½″ I. D. x 3″, was removed from the mold and machined to the desired size. After machining, the tube was placed in a furnace and heated for 2 hours at 2350° F. in an atmosphere of hydrogen and $SO_3$ gases. After this treatment, the body was tested and found to have an over-all porosity of 41.7%; 99% of which was "unsealed" or accessible to flow of fluids through the body. The tensile strength of this body was found to be 1,310 p. s. i.

This body was then saturated with mineral oil and placed in a coining machine having about .010 inch clearance per side between the die and ram.

Compression loads were placed on the edges of the tube and the specimen was coined. With a compression loading of 3,500 p. s. i., the reduction in length of the sintered tube was 5%; at 6,000 p. s. i., it was 10%; at 9,000 p. s. i., it was 15%; and at a pressure of 12,000 p. s. i., the reduction in length of the tube was 20%.

After the tube was reduced in length 20%, it was removed from the coining machine, heated to evaporate the oil, and tested. It was found that the over-all porosity was now 30%. The compacted, sintered body was then heated for 4 hours at 2300° F. in an atmosphere of hydrogen gas. At the end of this heat treatment, the body was removed from the furnace and again tested. The final tensile strength of the body was 4,370 p. s. i. and its over-all porosity was 30%, 70% of which was "unsealed." The surface permeability of the body was uniform.

*Example 2*

This example was similar to Example 1 except that a low porosity body was initially made by using −325 mesh (3–60 microns) nickel powder. Before impregnation and coining this sintered body had an over-all porosity of 21%, 80% of which was "unsealed," and a tensile strength of 4,540 p. s. i. After impregnation with oil, coining to a 20% reduction in length from a compression loading of 29,000 p. s. i. on the end of the tube, and sintering in hydrogen, the over-all porosity of this metallic body was 9%, 50% of which was "unsealed." Its tensile strength had increased to 11,050 p. s. i. Its surface permeability was also uniform.

In summary, it is apparent that this invention provides an easy method for strengthening a porous, metallic body while simultaneously effecting the maintenance of a substantial amount of the "unsealed" porosity of the body. Furthermore, the liquid within the pores of the body also acts as a lubricant during the coining operation preventing smearing of the surfaces of the particles and thus sustaining the evenness of surface permeability or flow from the body. By keeping the surface pores open or unsmeared, it is unnecessary to undertake special treatments to renew the surface permeability which naturally add to the ultimate cost of the body. This invention also discloses that it is possible to produce high strength, porous, metallic bodies of low permeability which do not require the use of fine powders. Coarser powders are cheaper to obtain, handled easier, and their rate of consolidation is such that the resulting body is free from cracks, tears, and distortion. It is feasible, however, as shown in Example 2, above, to apply this process in manufacturing bodies from fine powders. Such a body has a lower, more even permeability than is theoretically obtainable with the smallest size powders available unless long time, high temperature sintering, with all its attendant problems of shrinkage, etc., is employed. Moreover, an increase in strength of these bodies has been achieved without recourse to high heats, high compression, or impregnation processes which require careful preparation of materials and employment of special equipment and which result in spotty depositions and loss of permeability.

What is claimed is:

1. The method of increasing the strength without substantially increasing the sealed porosity of a porous, metallic body, which comprises impregnating a ductile, porous, permeable metallic body with a material in a liquid state, said material being insoluble with respect to the metal of which said body is made, compressing said impregnated body to increase its density while said material is in a liquid state, and finally slowly heating said body to sintering temperatures in an atmosphere of hydrogen.

2. The method of controlling the permeability of a porous, metallic body, which comprises impregnating a porous, permeable, metallic body with a substantially inert, readily removable, insoluble liquid, compressing the impregnated body containing said liquid to appreciably reduce its overall size, and finally heating said body in a reducing atmosphere to remove any liquid remaining in said body after said compression step and to refuse any particles which have been ruptured or brought into contact during said compression step.

3. The method of strengthening a porous metallic body while controlling the permeability thereof, which comprises impregnating a porous body made from metallic particles of from −325 to −100+200 mesh with a material in a liquid state and insoluble with respect to the metallic particles, compressing said impregnated body containing said material in a liquid state to obtain an appreciable change in the overall size thereof, and finally heating said body slowly in a reducing atmosphere to sintering temperature to remove any impregnant remaining from said compression step and to resinter said body.

4. The method of increasing the strength with retention of uniform surface permeability and without substantially increasing the sealed porosity of a porous metallic body, which comprises impregnating a ductile, porous metallic body with a substantially inert, readily-removable, insoluble, hydrostatic material, compressing said impregnated body while said material is in the liquid state to obtain an appreciable reduction in the overall size thereof, removing hydrostatic material from the compressed body, and finally sintering the body in a reducing atmosphere.

5. In the method of producing a porous, metallic body having increased strength without a substantial increase in its sealed porosity and without surface smearing, the steps consisting of impregnating a porous ductile metallic body with a substantially inert readily-removable, hydrostatic material insoluble with respect to the metal of which the body is made, compressing said body while said material is in the liquid state to increase its density while permitting the excess of said hydrostatic material to escape therefrom, and finally sintering said body under reducing conditions and thereby removing the remainder of said hydrostatic material from said body.

WALLACE W. BEAVER.

REFERENCES CITED

The following references are of record in the file of this patent:

UNITED STATES PATENTS

| Number | Name | Date |
| --- | --- | --- |
| 2,157,596 | Davis | May 9, 1939 |
| 2,187,086 | Koehring | Jan. 16, 1940 |
| 2,373,405 | Lowit | Apr. 10, 1945 |
| 2,462,045 | Wulff | Feb. 15, 1949 |

OTHER REFERENCES

Wulff: Powder Metallurgy, published by American Society for Metals, Cleveland, Ohio, 1942, page 396.